United States Patent
Tomarkin

(10) Patent No.: US 11,907,964 B2
(45) Date of Patent: Feb. 20, 2024

(54) MACHINE FOR AUDIENCE PROPENSITY RANKING USING INTERNET OF THINGS (IOT) INPUTS

(71) Applicant: Acxiom LLC, Conway, AR (US)

(72) Inventor: Craig William Tomarkin, Fairfield, CT (US)

(73) Assignee: Acxiom LLC, Conway, AR (US)

( * ) Notice: Subject to any disclaimer, the term of this patent is extended or adjusted under 35 U.S.C. 154(b) by 798 days.

(21) Appl. No.: 16/978,287

(22) PCT Filed: Mar. 7, 2019

(86) PCT No.: PCT/US2019/021079
§ 371 (c)(1),
(2) Date: Sep. 4, 2020

(87) PCT Pub. No.: WO2019/173550
PCT Pub. Date: Sep. 12, 2019

(65) Prior Publication Data
US 2021/0012362 A1 Jan. 14, 2021

Related U.S. Application Data

(60) Provisional application No. 62/639,801, filed on Mar. 7, 2018.

(51) Int. Cl.
*G06F 17/00* (2019.01)
*G06Q 30/0204* (2023.01)
(Continued)

(52) U.S. Cl.
CPC .......... *G06Q 30/0204* (2013.01); *G06N 5/02* (2013.01); *G06N 5/04* (2013.01); *G16Y 30/00* (2020.01); *G16Y 40/35* (2020.01); *H04L 67/12* (2013.01)

(58) Field of Classification Search
CPC ........ G06Q 30/0204; G06N 5/02; G06N 5/04; G16Y 30/00; G16Y 40/35; H04L 67/12
See application file for complete search history.

(56) References Cited

U.S. PATENT DOCUMENTS 9,467,567 B1 * 10/2016 Barkan .................. G06Q 10/06
9,898,756 B2    2/2018 Allan et al.
(Continued)

FOREIGN PATENT DOCUMENTS

KR          101785219 B1    10/2017

OTHER PUBLICATIONS

Rushi Bhatt et al., Predicting product adoption in large-scale social networks. In Proceedings of the 19th ACM international conference on Information and knowledge management, Asso. for Computing Machinery, 1039-1048. <https://doi.org/10.1145/1871437.1871569>, Oct. 2010.*

(Continued)

*Primary Examiner* — Greta L Robinson

(57) ABSTRACT

A specially programmed machine and method generates propensity information based on inputs received from machines connected as part of an Internet of Things (IoT) environment, where the machine appends a predictive segmentation attribute to each data input received and generates a matrix based on the counts of each attribute-input combination. The attribute-input counts for each combination are converted to a statistical metric that represents propensity information for consumers fitting into the segment associated with the particular attribute. The propensity information can be relayed to a client in a variety of ways, including a direct display of the propensity information, appendage of the propensity information to the clients database, or using the information to provide an audience report to the client.

14 Claims, 2 Drawing Sheets

(51) Int. Cl.
*G16Y 30/00* (2020.01)
*G16Y 40/35* (2020.01)
*G06N 5/02* (2023.01)
*G06N 5/04* (2023.01)
*H04L 67/12* (2022.01)

(56) References Cited

U.S. PATENT DOCUMENTS

| | | |
|---|---|---|
| 2009/0018922 A1 | 1/2009 | Steelberg et al. |
| 2013/0325530 A1* | 12/2013 | Pal .................... G06Q 30/0204 |
| | | 705/7.11 |
| 2014/0032259 A1 | 1/2014 | LaFever et al. |
| 2014/0278786 A1 | 9/2014 | Liu-Qiu-Yan |
| 2014/0278918 A1 | 9/2014 | Moran |
| 2014/0289005 A1* | 9/2014 | Laing .................... G06Q 30/02 |
| | | 705/7.31 |
| 2015/0019342 A1 | 1/2015 | Gupta |
| 2015/0081436 A1* | 3/2015 | Robbins ............. G06Q 30/0255 |
| | | 705/14.53 |
| 2016/0055236 A1 | 2/2016 | Frank et al. |
| 2016/0275594 A1 | 9/2016 | Mullakkara Azhuvath et al. |
| 2017/0169341 A1 | 6/2017 | Tang |
| 2017/0220817 A1 | 8/2017 | Shen et al. |
| 2018/0012242 A1 | 1/2018 | Phan |
| 2018/0084057 A1 | 3/2018 | Wang et al. |

OTHER PUBLICATIONS

Fiserova, Jana et al., "What Drives Customer Propensity to Recommend a Brand?", British Academy of Management (2017).
Mardesa, Adeleke et al., "Dirichlet Model: Its Consistency and Tracking Pattern Using Buying Behavior Data," Researchgate.net (Dec. 2017).

* cited by examiner

MACHINE FOR AUDIENCE PROPENSITY RANKING USING INTERNET OF THINGS (IOT) INPUTS

This application claims priority from U.S. provisional patent application No. 62/639,801, filed on Mar. 7, 2018, and entitled "Internet of Things (IoT) Audience Propensity Ranking Engine." Such application is incorporated by reference as if fully set forth herein.

TECHNICAL FIELD

The field of the invention is machines and methods for audience propensity ranking.

BACKGROUND ART

Marketers often describe the consumers to whom they are directing their marketing messages as the target "audience." Identification of the best possible audience for a marketing message is of critical importance. Failure to reach the consumers who are likely to make a purchase based on exposure to the marketing message—i.e., choosing the wrong audience—means that the marketing message will be ineffective. On the other hand, a blanket approach (mass marketing) is expensive, because the cost of marketing, particularly digital marketing, is generally based on the number of persons who are likely to view or who do in fact view the marketing message. Therefore, identifying the appropriate consumers for the creation of an audience for a marketing message, and eliminating those that are not appropriate, is essential for maximizing the return on investment (ROI) for a particular marketing campaign.

One metric that marketers commonly employ for identifying an audience for a marketing message is consumer "propensities." A propensity is a characteristic of the consumer that makes that consumer more or less likely to respond positively to a marketing message for a particular product, service, or brand. For example, "gluten-free" may be a consumer propensity associated with a consumer that is known to shop specifically for foods that are gluten free. Likewise, "affinity for Toyota" may be a propensity for a consumer who is known to prefer Toyota branded vehicles. Still another example may be "has a 529 plan"; although this type of propensity does not tell anything directly about a consumer's actual purchases or brand affinities, it may allow a marketer to infer a great deal about the consumer, such as the inference that the consumer has children and thus may be more likely to purchase children's clothing; that the consumer is a habitual saver and thus may be more interested in certificates of deposit or other investment products; and that the consumer has an income above a certain threshold and thus may be more likely to respond to a marketing message for upscale products and services.

Companies that maintain broad-based data about a population of consumers may track thousands of propensities about tens or even hundreds of millions of consumers. For example, Acxiom LLC of Conway, Arkansas offers a product called Acxiom Audience Propensities, which adds to consumer data a very large suite of integrated scores that are designed to predict consumer behavior as well as product and brand affinities. These may be included with data provided by Acxiom LLC to a client, or may be appended to data that a client already possesses. Clients may include, for example, retailers or advertising agencies associated with retailers.

The vast majority of consumer propensity data in propensity products today is not directly known. Instead, the data is inferred mathematically based on other information known about the consumers. Specifically, a regression model is applied to infer many of the propensities that are supplied as part of a propensity product. Although the use of regression models for such determinations is a well-known and often highly accurate method of determining data such as consumer propensities, regression analysis is computationally complex and therefore expensive. While this might not be a critical concern if only a few consumers were involved, the entities that maintain consumer data often maintain such data, as noted above, for tens or even hundreds of millions of individual consumers or households. Thus the regression analysis must be performed for each inferred propensity for each of these millions of consumers, requiring billions or even trillions of separate regression analysis calculations. The problem is further exacerbated by the fact that consumer data is constantly changing, and thus propensities must be periodically recalculated, with the periodicity of the re-calculation being an important factor in the accuracy of the consumer propensity inferences. It may be seen, therefore, that the use of regression analysis for inferring consumer propensities is extremely expensive in computational terms, and therefore increases the cost to a marketing services provider of supplying the propensity product to its customers.

Another important limitation of audience propensity products today is that they rely on the skill and experience of experts who create the necessary models to construct the regression analysis. The fact that humans are required to build a model before calculations are performed adds greatly to the cost of the resulting product, and introduces a subjective component to the results. A machine that provides a fully automated method of generating propensity data would thus be highly desirable.

A number of marketing service companies provide "segmentation" services, either with their data or applied to a customer's data. Segmentation is the assignment of consumers into groups that are, in some manner, homogeneous. For marketers, segmentation is made based around a series of demographic, behavioral, or other traits that are believed to drive certain purchasing behaviors. For example, Acxiom LLC's segmentation product, Personicx, divides all U.S. households into 70 distinct clusters within 21 "life stage" groups. A forty-year-old married person with children, who owns his or her home, has a household income of greater than $120,000, and a household net worth of between $1,000,000 and $2,000,000, would fall into Personicx cluster 4, "Top Professionals." This cluster is characterized by Acxiom as follows:

> Top Professionals are established, wealthy families, often with older children and teens, living in the lap of suburban luxury. With high rankings for education, income and net worth, Top Professionals contains married executives and professionals who earn top-dollar incomes, monitor their investments and indulge in an expensive array of activities. Reflecting their devotion to kids, they head to the beach and enjoy family-friendly sports. They also jog and pay attention to their own health and fitness. Members of this cluster often drive a luxury minivan or SUV. They are frequent shoppers, buying clothes for themselves and their kids, and furnishing their houses.

Segmentation is generally used as a proxy for more specific consumer propensity data, and because it is a single number, is much less computationally intensive to create and maintain than a full set of thousands of consumer propensities. Segmentation data is, however, a generalization that, although highly useful in many marketing scenarios, does not address all of the audience building needs that a full suite of propensity data can provide.

Another problem facing the marketing service company that wishes to provide propensity data is that the marketing service provider may not own the underlying data upon which the regression analysis is being performed. The data must then be leased from third-party data brokers, which is another factor that significantly increases the cost and complexity of providing a consumer propensity product. In the real world, almost all marketing service companies provide data that is a complex aggregation of data from many sources, so that at least some of this data must be leased from third parties. Publicly available data would be preferable because it may be obtained at no cost. In addition, inferences made based on data that does not contain any personally identifiable information (PII) would be desirable because the resulting inferences would not be classified as PII, and therefore would not be subject to the various restrictions required by privacy laws and regulations, nor to the industry best practices that ethical marketers employ when using PII in their marketing enterprises. Furthermore, the use of public data and/or non-PII data would allow for the expansion of the availability of propensity data, because its derivation would no longer be reliant upon the existence of specific demographic, behavioral, or other data for each consumer.

It may be seen, therefore, that an alternative method for inferring consumer propensities that is computationally less expensive than regression analysis would be highly desirable, and similarly a specially programmed machine that implemented this method without requiring the input of human experts would also be highly desirable. Likewise, it may be seen that a means of inferring consumer propensity data that does not rely upon data that must be leased, and that does not rely upon data that contains PII, would also be highly desirable.

References mentioned in this background section are not admitted to be prior art with respect to the present invention.

DISCLOSURE OF INVENTION

The present invention is directed to a machine and method for propensity ranking that does not employ individual regression models. Instead, the machine calculates indexes based on the relationship between various categories of input data that are used as a segmentation mechanism; for this reason, this approach will be referred to as predictive segmentation herein. In certain implementations of the specially programmed machine described herein, matrices are created that define the relationship between the predictive segmentation and hundreds, thousands, or even more of the various characteristics that may apply to a consumer. These matrices contain an index or other statistical metric that defines the relationship between each characteristic and every other characteristic in the matrix. Using the indices in this matrix, the machine may infer something about every other characteristic of a consumer knowing only a few or even one of the characteristics for a particular consumer. The characteristics need not contain P11, nor need they necessarily be based on proprietary data.

The calculation of indices is far less computationally complex than regression model analysis, and the results are near-instantaneous, thus greatly lowering the computational cost of providing a propensity product. This dramatically improves the performance of a specially programmed machine constructed to perform this function. Furthermore, the machine can provide these propensities without the intervention of a human modeler. Because many of the inputs that may be employed in the operation of the machine are themselves generated by other machines communicating on the Internet, the machine is particularly suited for operation in an Internet of Things (IoT) environment. Because the machine does not necessarily rely upon specific demographic, behavioral, or other factors for the calculation of each propensity, it may be applied to a far greater number of consumers or households. In some cases, only a single known trait about a consumer is enough to provide deep insights about the consumer to include demographics or other information about that consumer even where no actual demographic data is directly accessible by the machine. The trait or traits being used may be public domain and may in certain instances use no PII, thus allowing the product to be used in a far greater number of circumstances without compromising the consumer's privacy rights, while lowering the cost of providing the product where public (free) data is being used.

These and other features, objects and advantages of the present invention will become better understood from a consideration of the following detailed description of the preferred embodiments and appended claims in conjunction with the drawings as described following:

BEST MODE FOR CARRYING OUT THE INVENTION

Figure 1:
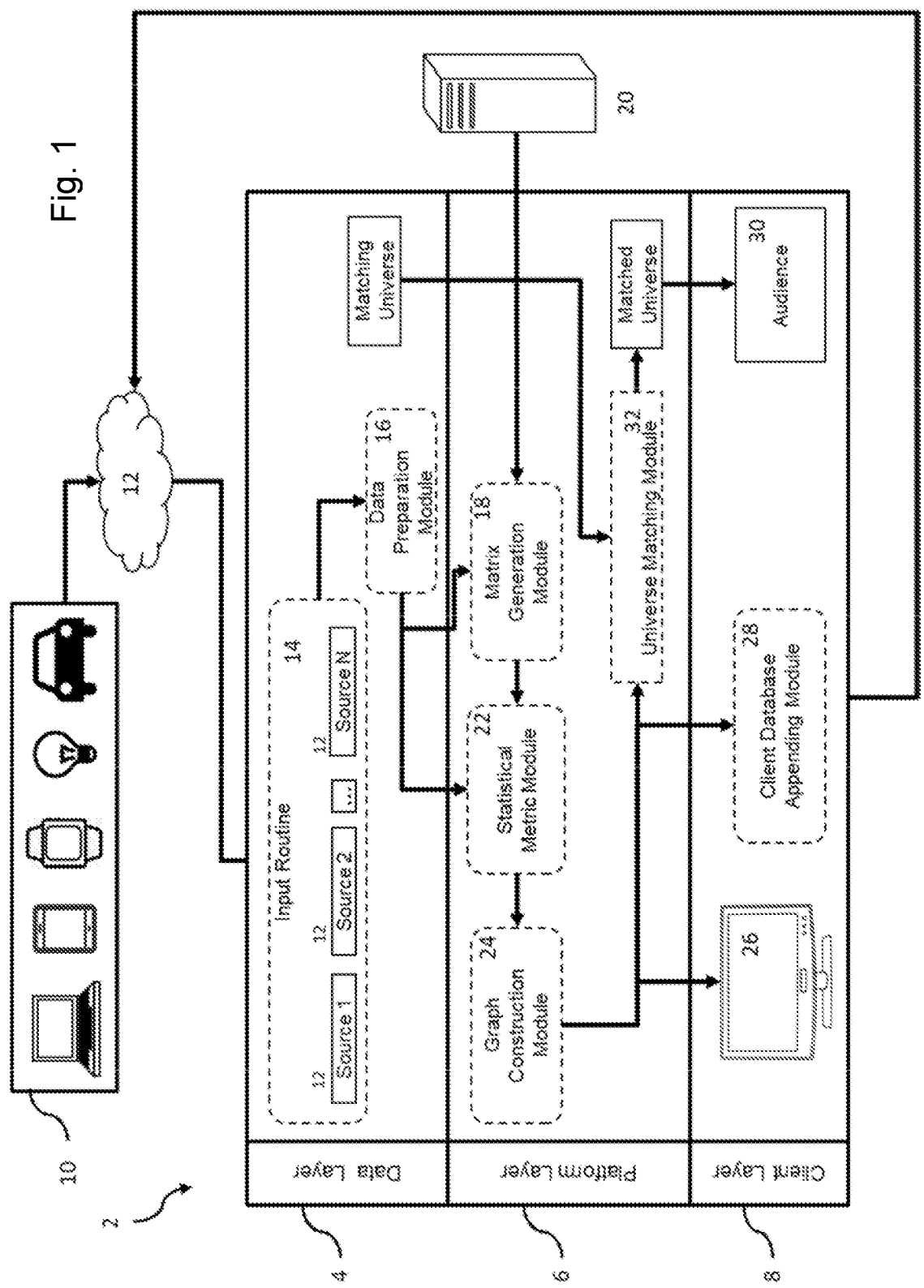
FIG. 1 is an overall data flow diagram for a specially programmed machine in one implementation of the invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Generally speaking, the present invention in certain implementations is directed to a specially programmed machine and method for propensity ranking that calculates indexes based on the relationship between various categories of input data that is used as a segmentation mechanism. These propensity rankings and indexes may be continuously updated over-time as input data is received—meaning that as consumer data changes, propensities based off of the changing data may be recalculated to achieve more accurate sets of propensity inferences. The machine according to certain implementations of the invention can utilize a variety of inputs for the predictive segmentation, such as inputs that may be derived from other machines communicating on the Internet as part of the Internet of Things (IoT) environment. The IoT may be defined as the interconnection, by means of the Internet, of various computing devices, including computing devices embedded in everyday objects such as, for example, cameras and appliances. These various computing devices generate many types of outputs that are, in turn, inputs for the machine described herein.

Numerous categories of devices in the IoT environment may, in various implementations of the invention, provide inputs. Each of these inputs provides data or information about consumers that can be used by the machine to determine the relationships between the input data, which can subsequently be used to calculate index values that can be used for in the predictive inferences. That is, based on indexes created by certain input information received from IoT machines outputting such input information, predictions on whether a certain type of consumer having such input characteristics is likely to respond positively to a marketing message for a particular product or brand (with characteristics potentially entirely unrelated to the input characteristics) can be achieved. Examples of the types of inputs that may be used include input such as identifier inputs, geographic inputs, digital inputs, virtual reality inputs, social inputs, time inputs, camera inputs, health inputs, transactional inputs, television inputs, and demand inputs (among many others).

Identifier inputs generally consist of general consumer identification information, such as first name, last name, telephone number, email address, and other similar information. This type of information is typical of the traditional data used in audience propensity calculations.

Geographic inputs include information about the location of a consumer, such as a street address, city, state, ZIP code or other similar regional identifier, and country. It may also include information about the real-time location of a consumer, such as a latitude/longitude coordinate that may be derived from global positioning system (GPS) data or cellular telephone tower triangulation data.

Digital inputs include information provided by various computing machines about the on-line locations a consumer has visited in the past, and the location a consumer may be presently visiting in an online environment. Such data includes, for example, various types of "cookies" set on a consumer's web browser. This data may or may not include PII.

Virtual Reality (VR) inputs include location information for a consumer that is presently located within a VR space. This information is provided by the machine facilitating the VR environment for the consumer.

Social inputs include consumer posts in various online social media, as well as what the consumer reads in these same spaces.

Time inputs can include temporal information such as the date, the day of the week, the season of the year, and the like.

Video captured by IoT cameras and transmitted over the Internet can provide information such as what a consumer has looked at in a brick-and-mortar store, what the consumer is currently looking at, facial expressions of the consumer in response to a particular product or marketing message, and the like. This information may or may not include PII.

Health information may include medical visits of the consumer, medical information the consumer has viewed online, and the like. Direct health information generally does include PII, much of which is strongly protected by privacy laws such as HIPAA. Other information, however, may be less protected or may not even include PII, such as the browsing activity of anonymous individuals accessing health-related websites.

Transactional data may include, for example, purchase history, either in categories of products and services or with respect to particular products and services.

Television information may include consumer watching behavior, channels or streaming services chosen, time of day, and the like, as provided by set-top boxes, streaming devices, and other connected devices in an IoT environment. Again, this data may not require PII when anonymous consumer watching information is used.

Demand data includes the physical proximity of a consumer to the location of certain businesses, or the location where particular services are provided.

Turning now to FIG. 1, the specially programmed machine 2 may be conceptually visualized as a data layer 4, platform layer 6, and a client layer 8 with associated data flows. The machine 2 is connected over a network 12 to a number of IoT machines/devices 10. At data layer 2, various sources of data 12 are received across the IoT environment as inputs 12 to the machine 2. That is, as the IoT machines 10 output the type of input information (and other types) described above, which is collected through the normal and customary uses of the IoT machines 10, the machine 2 of the present invention receives the input messages 12 through an input routine 14 executing at data layer 4 of the machine 2. The input routine 14 is configured to receive input messages 12 from the various IoT machines 10 in communication with the machine 2 over the network 12, each one of the input messages 12 containing input information from a particular one of the IoT machine 10 sources. In one embodiment, the machine 2 may receive the input messages 12 constantly and in real-time from the IoT machines 10 such that the data utilized by the machine 2 is constantly updated. Alternatively, the machine 2 may receive the input messages 12 in batches at particular intervals or the machine 2 may include a fetching routine (not shown) configured to fetch the data 12 from the IoT machines 10. The possible number of input messages 12 received (and the types of input information generated by the IoT machines 10) is limited only by the vast array of interconnected devices providing data to other machines across the Internet.

After the input messages 12 are received at the data layer 4 through the input routine 14, the input information is read from each of the received input messages 12. In one particular implementation of the present invention, demographic data associated with the user of the IoT machine 10 sending the particular input message 12 (and thus the input data received from the particular IoT machine 10) is known. Based on the known demographic information of the user associated with the IoT machine 10 (for example, the particular wearer of a smart watch sending various information through the network 12 to the machine 10), the IoT input information can be associated with one or more predictive segmentation attributes. Knowing the age, marital status, household child information, homeownership, household income, household net worth, and other similar demographic information about a person, one or more clusters/segments from Acxiom LLC's segmentation product Personicx can be appended to the particular input message information received. For example, consider an IoT device 10 known to be associated with a forty-year-old married person with children, who owns his or her home, has a household income of greater than $120,000, and a household net worth of between $1,000,000 and $2,000,000. That device 10 then transmits an input message 12 to the machine 2 having certain updated information (such as, for example, the particular consumer has purchased a sunroof accessory—and therefore likely owns a vehicle with a sunroof). That data can then be associated with Personicx Cluster 4. A data preparation module 16 takes each input data point 12 and sets it as binary, and then appends predictive segmentation attributes as a prerequisite to the processing performed at platform layer 6. The result of appending the predictive segmentation attributes is a number of different combinations of consumer-attribute pairs, each pair identifying a particular consumer in some manner and tying that to a segmentation attribute.

At platform layer 6, a matrix generation module 18 is called upon to create a summary matrix with counts by data element (e.g., a consumer characteristic such as likelihood of owning a car with a sunroof) and attribute (e.g., the particular segment or clusters associated with the particular predictive system). That is, a total count for each consumer-attribute pair combination is determined. In one implementation, the matrix generation module 18 is in communication with a database 20 hosting the segmentation system parameters (such as the Acxiom LLC Personicx segmentation product and related cluster information). An example summary matrix is shown in Table 1 below.

TABLE 1

| 185 | 171 | 157 | 163 | 142 | own/lease w/sunroof | |
|-----|-----|-----|-----|-----|---------------------|-------------|
| Cl. 1 | Cl. 2 | Cl. 3 | Cl. 4 | Cl. 5 | Product | Correlation |
| 58 | 40 | 64 | 64 | 73 | Last 12 months: AutoZone | (0.312) |
| 47 | 51 | 63 | 57 | 106 | Last 12 months: Walmart | (0.211) |
| 104 | 131 | 111 | 149 | 99 | Brand: Ghirardelli | 0.261 |
| 74 | 114 | 77 | 10 | 116 | Brand: Whitman's | (0.326) |

Once the counts of data elements associated with each attribute are determined, the counts are then converted to a statistical metric by a statistical metric module 22. This statistical metric may be a simple index as described in the examples that follow, or may be any other such metric, including "delta" values as described in U.S. Pat. No. 9,535,933, which is incorporated by reference as if fully set forth herein. A graph construction module 24 uses the statistical metric calculation and matrix generated to form an insight graph described below. Upon the receipt of new data 12 from the IoT machines 10 associated with known demographic users, the predictive indexes can be updated to reflect the propensities of consumers associated with a particular attribute (or cluster) based on the new information received about the known user in that particular cluster.

The client layer 8 provides the mechanisms for relaying the audience information derived above to the customer of the propensity product (such as a brand/retailer or Internet publisher). In one embodiment, for example, the client layer 8 includes a reporting mechanism that includes the employment of a user interface 26 at a client machine set up for allowing the customer to access various results information. Thus, the user interface 26 may allow for display of an insight graph, appending of audience data to existing data at a client database appending module 28, matching propensity data to a matching universe of audience data to generate an audience report, or simply output of the audience 30, for example. In the case of audience selection reporting, the output at the client layer 8 is insight reporting as described below, which can be displayed, for example, at a client machine 26. The correlation between two elements is returned and may, in certain examples, be based on segmentation products. In the case of the append selection, the output at the client layer 8 is matched to the client's own database through a client database appending module 28. The client's data is thereby enhanced with this additional propensity data for the consumers or households contained in the client's in-house data. In the case of output audience, the attributes and the indexes are matched to a matching universe through a universe matching module 32, and the result at the client layer is a complete audience 30 for use in a marketing campaign. In each case, the results at the client layer 8 may be sent to a receiving machine 10 in an IoT environment over the network 12. The process may thereby be fully automated pending the inputs from the user interface accessed by the consumer, and thus requires no oversight from the marketing service provider maintaining the machine 2.

In a simple example for illustration purposes, the machine 2 according to certain implementations of the invention may be used to correlate the propensity element "own/lease vehicle with sunroof" to other buying behaviors. The correlations may be based on a segmentation system, such as the Personicx segmentation system of Acxiom LLC. A simplified matrix, showing only the first five of the seventy Personicx clusters, is provided in Table 1 as set forth above. In this example, it may be seen that an index is provided between each of the first Personicx clusters and the propensity of a person to own or lease a vehicle with a sunroof. The indexes are shown in the first row. For example, the index for those persons in Personicx Cluster 1 is 185, which indicates that consumers or households in this cluster have an 85% increased chance to own or buy a vehicle with a sunroof than other consumers or households generally. Consumers or households in Cluster 2 have a 71% increased chance to own or buy a vehicle with a sunroof, and so on. When an input message is received at the machine from a particular IoT device 10 and that input message contains information related to a known demographic user, the index for persons in the particular segment associated with that demographic can be updated.

As input messages 12 are received and the input data is used to update the indexes, various inferences about consumers in particular clusters can be made. For example, when looking at the Table 1 example to analyze whether a sunroof purchasing consumer or household purchased a product from AutoZone or Walmart in the last twelve months, it may be seen that there is a negative correlation for all clusters (because the index values are less than 100) for AutoZone purchases, whereas there is a negative correlation for each of Clusters 1 through 4 but not cluster 5 for Walmart purchases. The overall average correlation is shown in the right-most column, with parentheses indicating negative correlation. Overall correlation may be particularly useful when an IoT device 10 is associated with an unknown demographic user such that the particular user associated with that IoT cannot be readily associated with a particular cluster. Likewise, it may be seen from the data in Table 1 that sunroof purchasers in the first five clusters are more likely to buy Ghirardelli chocolate than to buy Whitman's chocolate. This is reflected in the average correlation, which is a positive 0.261 for Ghirardelli chocolate for these five clusters, but a negative 0.326 for Whitman's chocolate in these five clusters. Using the data from Table 1 and knowing whether a consumer or household owns or leases a vehicle with a sunroof, it may be inferred whether such consumer or household is likely to purchase products at Walmart or AutoZone, and if so how likely, and it may further be inferred whether such consumer or household is likely to purchase Ghirardelli or Whitman's chocolate, and if so how likely. Knowing the demographic information of the consumer or household (and thus being able to identify a particular cluster associated with the consumer or household) allows for a more focused inference about that consumer or household. A consumer or household who owns an automobile with a sunroof and falls into Cluster 1, for example, is unlikely to purchase from AutoZone, even more unlikely to purchase from Walmart, slightly more likely than average to purchase Ghirardelli chocolate, and less likely than average to purchase Whitman's chocolate. These propensities can thus be calculated simply by these index scores without the need for the construction of any models, without the need for any regression analysis, and without the intervention of human experts to create models.

Extending the example of Table 1, a ranking can be performed by placing the top indexing cluster as Rank 1 and the lowest indexing cluster as Rank 70 (now including all seventy Personicx clusters). The machine may select down from the top rank as many as desired in order to reach the target number of consumers or households for a particular campaign. For example, the top three ranks may be sufficient to reach the desired number of persons. Or, as an alternative, a rule may be created that only the top two ranks (or any other number) are always chosen, irrespective of how many consumers or households are reached. It may be seen that there is thus no reason to perform all of the computationally intensive tasks of individually scoring each consumer or household, which in a real-world example would involve hundreds of millions of records. Instead, the simple matrix of indices is all that is needed. This example may be extended to all of the types of input devices 10 listed above, or any other inputs that may be received across an IoT environment. In addition, because of the computational simplicity of this approach, it is not necessary to limit the segmentation to only the 70 Personicx clusters, and instead the segmentation can be extended to a far greater number of clusters in a more complex segmentation system, the results of which builds more precisely targeted audiences.

Figure 2:
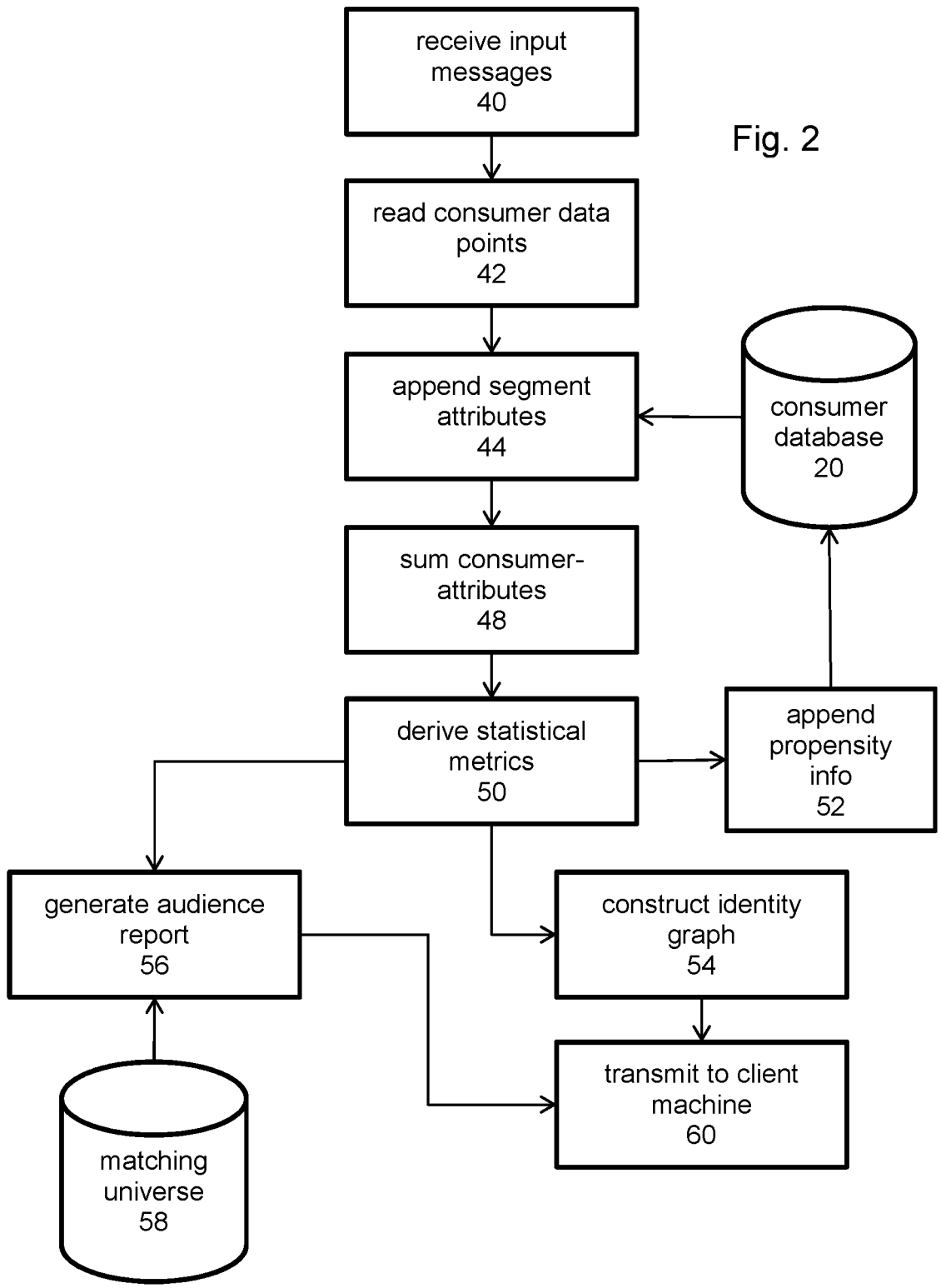
FIG. 2 is a flow chart for a process according to one implementation of the invention.

The invention in certain implementations may also be understood as a process, illustrated by the flow chart of FIG. 2. At step 40, the input messages are received, and at step 42 the consumer data points (from the devices 10 of FIG. 1) are read in from the input messages. At step 44, predictive segmentation attributes are appended to the consumer data points, which are fetched from consumer database 20 (also shown in FIG. 1). A total is calculated for each consumer-attribute pair combination at step 48, and then the count of each consumer-attribute pair combination is converted into a statistical metric at step 50. This statistical metric may be an index value relaying propensity information about the associated consumer. An insight graph is constructed at step 54, and transmitted to client machine 60 to provide insights to the client of the data services provider who is providing this service. One or more result relaying tasks may be performed in addition to providing the identity graph at step 54. For example, matching universe 58 may be used to generate an audience report at step 56, which, like the identity graph constructed at step 54, is transmitted to the client machine at step 60. In addition, the propensity information may be appended to data already housed at consumer database 20 at step 52.

The foregoing examples assume that demographic data (either data that allows segmentation or the segmentation results themselves) are available, but the invention is not so limited. It may also be applied when no demographic data is available. For example, one may consider a machine interacting with other machines through the IoT, collecting free data online about readership for 1300 magazines, as well as information about what magazines are "also viewed" by persons who read those magazines, along with related metadata. These data could then be correlated, without the requirement of demographic data, or PII, or even any geographic data. The assignment, in various implementations, may be done directly or indirectly. In an example of direct assignment, consider the case where the marketing service provider's customer is the magazine publisher. Suppose that some of the customer's magazines are in the correlation matrix that has been constructed. Each consumer/household who subscribed to a particular magazine is then assigned correlation values for that magazine relative to all of the other magazines published by the customer. This same correlation calculation is repeated for each of the magazines that the customer publishes.

In the case of indirect assignment, one may consider the example where a consumer or household did not buy any of the magazines that the customer publishes. In that case, the correlations may be keyed off of another characteristic that relates to one of the magazines. For example, suppose that some of the consumers or households are flagged as visiting a Hearst Communications website through cookies or like data. The machine may then find the highest correlating magazine to that data and then proceed to score from there. It may be seen that, using this approach, 1300 interest elements (corresponding to the number of magazines in this example) with 100% coverage may be provided to the customer, without the requirement of paying any royalties and, because there is no PII involved, no privacy restrictions on use of the data. These indirect assignments may not be as accurate as direct assignment, but otherwise there would be no data available at all in many cases. In addition, because the indirect assignment does not use any PII, this approach may be available in jurisdictions where privacy restrictions make the use of PII in the direct approach difficult or simply unavailable.

One consideration in using the machine as described herein is the quality of the solution it provides. Each solution creates a matrix, referred to herein as an insight graph. The insight graph may be compared to a truth file, referred to herein as the target matrix. The quality of the solution is measured in terms of the relative size, reach, and strength of the insight graph as compared to the target matrix. The best solution will be the one that has the highest, parsimoniously-correlated insight graph that includes the most elements and can be scored on the highest number of consumers or households. It can also be the one that, in testing, performs best in regression models used for off-line analysis. The steps therefore in judging the quality of the solution are as follows. First, establish the target matrix. This may be generated directly from, for example, survey response flags, or from a factor score-weighted matrix. Second, a baseline insight graph is generated, such as one based on a segmentation product. The quality determination is made by comparing each such baseline insight graph created with the target matrix. Various competing solutions are tested. For each solution, if the associated baseline insight graph corresponds better with the target matrix than any of the previously generated baseline insight graphs, then that baseline insight graph becomes the resultant insight graph. If two solutions have the same level of correlation, then various approaches may be used to determine the better of the two. If one is more parsimonious, then the simpler one is chosen; if one includes more elements, then the larger one is chosen; and if one can be scored on more consumers or households and in more contexts, then the broader one is chosen.

An additional example shows how additional data elements may be generated using only freely available, geographic data from the U.S. Census Bureau, which can then be used by the machine as input data for the predictive segmentation. In the first step, 517 MI geographical elements are reduced to those fairly representing the diversity in the U.S. Census data. Keeping the number of elements small makes the solution comparatively lightweight and easier to assign without losing much of its predictive power. In the second step, principal components analysis is applied so that these elements are converted to a small number of factor dimensions. The result is new data elements with 100% coverage. These new elements are then used as the basis for a K-means clustering, which results in an entirely new cluster segmentation with 100% coverage. A new data element, for example, may then be created for a married homeowner, as shown in Table 2:

TABLE 2

| | | |
|---|---|---|
| miACS_11_040 | + | Households % married householder |
| miACS_25_005 | + | Occupied housing units % owner occupied |
| miACS_25_018 | + | Housing units % 6+ rooms |
| miACS_11_012 | + | Households % married couples w/no related children |
| miACS_08_028 | + | Households % 1+ vehicles |
| miACS_25_002 | + | Occupied housing units median length of residence |
| miACS_17_002 | − | Households % below poverty level |
| miACS_25_036 | − | Renter occupied housing units % 5+ units |
| miACS_11_038 | − | Households % not families |
| miACS_25_006 | − | Occupied housing units % renter occupied |
| miACS_11_041 | − | Households % single householder |

To determine the quality of the result, the machine may utilize a comprehensive consumer database, such as the InfoBase product from Acxiom LLC, to construct the target matrix. Interest elements may be chosen from this database as model targets. If the models provide "lift," i.e., improved results, then the data is determined to be predictive. Cross-checking is then performed by determining if the models based on the new elements perform similarity to those based on all U.S. Census data that contributed to them, and similarly to simply using the geo-segmentation as ranks.

It may be seen from the foregoing example that the machine according to implementations as described herein can, depending upon the data chosen, result in royalty-free data products because the underlying data is publicly available. Likewise, the specially programmed machine allows for the assignment of propensity data and ranking to anonymous persons with nothing more than a geographic identifier for such persons. As a result, there are no legal restrictions on the use of this propensity data, no contracts with third parties required, and no privacy concerns because no PII is used. The marketing services provider is also protected from marketing "opt-out" lists, because these do not apply to this type of data and thus there is no need to remove consumers from the results based on opt-out laws. In addition, the required calculations are far less complex than traditional regression model analysis.

Furthermore, it may be seen that this approach is particularly well adapted for the machine using inputs from other machines in a fully automated, IoT environment with an ensemble of many machines. This "ensemble-assignment" approach with machines communicating with each other concerning the propensities of consumer behaviors may replace the far less effective designs intended for human marketers. Disparate pieces of information that are communicated across the Internet in the IoT environment are pieced together from these many sources to provide valuable insights. In addition, the ensemble assignment approach may be performed at different levels of aggregation and contexts. As a result, more effective propensity assignments can be achieved regardless of whether the particular consumer or household for which the assignment is being made can be identified with PII, or whether there is only geo-location data, a web address, or some other limited piece of information from which to begin. The simplicity of the calculations required allows the solution to scale easily, and allows the machine to be continually updating the result as additional machine inputs are constantly being provided through the IoT environment.

In various implementations of the present invention, the operations and the processes described above may be implemented in digital electronic circuitry, in tangibly-embodied computer software or firmware, or in combinations of these approaches. The invention may be implemented as one or more computer programs, with separate subroutines created by computer program instructions encoded on a tangible nonvolatile computer storage medium for execution by a data processing apparatus. The computer storage medium may be a machine-readable storage device, a machine-readable storage substrate, a random or serial access memory device, or a combination of one or more of these.

The term "data processing apparatus" includes all types of apparatus, devices, and machines for processing data, including by way of example a programmable processor, a computer, multiple processors or computers, and a cluster computer environment consisting of multiple processors that may perform operations in parallel. The apparatus may include special purpose logic circuitry. The apparatus may also include, in addition to hardware, code that creates an execution environment for the computer program in question, that is, code that constitutes processor firmware, a protocol stack, a database management system, an operating system, or a combination of one or more of these.

A computer program (which may also be referred to or described as a program, software, a software application, a module, a routine, a module, a script, or code) may be written in any form of programming language, including compiled and interpreted languages, or declarative or procedural languages, and it can be deployed in any form, including as a standalone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, optical disks, or solid state storage devices. However, a computer need not have such devices.

To provide for interaction with a user, a computer may have a display device, such as an LCD (liquid crystal display) monitor, for displaying information to the user, and a keyboard and a pointing device, such as a mouse, by which the user can provide input to the computer. The computer or computing system may further include a back-end component, such as a data server, or a middleware component, such as an application server, or a front end component, such as a client computer having a graphical user interface or a web browser through which a user can interact with an implementation of the subject matter described herein, or any combination of one or more such back end, middleware, and front end components. The components of the system may be interconnected by any form or medium of digital data communication, e.g., a communication network. Examples of communication networks include a local area network ("LAN") and a wide area network ("WAN"), such as the Internet.

The computing system can include clients and servers. A client and server are generally remote from each other and typically interact through a communications network. The relationship of client and server arises by virtue of computer programs running on the respective computers and having a client-server relationship to each other.

While the description of implementations of the invention here contains many specific implementation details, these should not be construed as limitations on the scope of what may be claimed, but rather as descriptions of features that may be specific to particular embodiments. Certain features that are described in this specification in the context of separate implementations may also be used in combination in a single implementation. Conversely, various features that are described in the context of a single implementation may also be used in multiple implementations separately or in any suitable sub-combination. Although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous, including circumstances where multitasking or parallel processing are not specifically called out herein. Furthermore, the separation of various system components in the implementations described above should not be understood as requiring such separation in all implementations, and it should be understood that the described program components and systems can generally be integrated together in a single software product or packaged into multiple software products.

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain preferred and alternative embodiments that are intended to be exemplary only and not limiting to the full scope of the present invention, as set forth in the appended claims.

The invention claimed is:

1. A specially programmed machine useful for generating propensity information, the machine being in communication with a plurality of devices across a network, the machine comprising:
   a. a data layer configured to execute instructions that when executed cause the machine to:
      i. receive from the plurality of devices a plurality of input messages comprising a plurality of consumer input data points;
      ii. read from the plurality of input messages the consumer input data points; and
      iii. append to each of the consumer input data points one of a number of predictive segmentation attributes thereby creating a plurality of different combinations of consumer-attribute pairs;
   b. a platform layer configured to execute instructions that when executed cause the machine to:
      i. generate a summary matrix, wherein generating the summary matrix comprises counting an amount of each consumer-attribute pair combination;
      ii. convert each of the counts of consumer-attribute pair combinations to a statistical metric relaying propensity information; and
      iii. construct an insight graph displaying the propensity information;
   c. a client layer configured to execute instructions that when executed cause the machine to perform one or more of the following result relaying tasks:
      i. transmit the insight graph;
      ii. append the propensity information to data housed at a client database; and
      iii. match the propensity information to a matching universe to generate an audience report, wherein the matching universe comprises audience data pertaining to consumers associated with the plurality of devices.

2. The machine of claim 1, wherein the at least one result relaying task of the client layer is configured to be sent to a client machine in communication with the machine across the network.

3. The machine of claim 1, wherein the plurality of consumer input data points comprises one or more of identifier data points, geographic data points, digital data points, virtual reality data points, social data points, time data points, camera data points, health data points, transactional data points, television data points, and demand data points.

4. The machine of claim 1, wherein the number of predictive segmentation attributes comprises a plurality of consumer categories based on demographic information.

5. The machine of claim 1, wherein each statistical metric is an index value.

6. The machine of claim 1, wherein each statistical metric is a delta value.

7. A system useful for generating consumer propensity information, the system comprising:
   a. a plurality of consumer machines connected to a network, each of the plurality of consumer machines configured to derive consumer data points associated with a plurality of consumers;

b. a predictive segmentation machine in communication with the plurality of consumer machines over the network, the predictive segmentation machine comprising:
  i. a data layer executing instructions that cause the machine to:
    A. receive a plurality of input messages comprising at least a portion of the consumer data points derived by the plurality of consumer machines;
    B. read from the plurality of input messages the consumer input data points; and
    C. append to each of the consumer input data points one of a number of predictive segmentation attributes thereby creating a plurality of different combinations of consumer-attribute pairs;
  ii. a platform layer executing instructions that cause the machine to:
    A. generate a summary matrix, wherein generating the summary matrix comprises counting an amount of each consumer-attribute pair combination;
    B. convert each of the counts of consumer-attribute pair combinations to a statistical metric relaying propensity information;
    C. construct an insight graph displaying the propensity information; and
  iii. a client layer configured executing instructions that cause the machine to perform at least one of the following result relaying tasks:
    A. transmit the insight graph to a user interface at a client machine for displaying the insight graph at a client location;
    B. append the propensity information to data housed at a client database; and
    C. match the propensity information to a matching universe to generate an audience report, wherein the matching universe comprises audience data pertaining to consumers associated with the plurality of devices.

8. The system of claim 7, wherein the plurality of consumer data points comprises at least one of identifier data points, geographic data points, digital data points, virtual reality data points, social data points, time data points, camera data points, health data points, transactional data points, television data points, and demand data points.

9. The system of claim 7, wherein the number of predictive segmentation attributes comprises a plurality of consumer categories based on demographic information.

10. The system of claim 7, wherein each statistical metric is an index value.

11. The system of claim 7, wherein each statistical metric is a delta value.

12. A method useful for generating propensity information, the method comprising the steps of:
  a. receiving at a predictive segmentation machine a plurality of input messages from a plurality of consumer devices in communication with the predictive segmentation machine across a network, each of the plurality of consumer devices configured to derive consumer data associated with a number of consumers, and the plurality of input messages comprising at least a portion of the consumer data points derived by the plurality of consumer devices;
  b. reading from the plurality of input messages the consumer data points received from the consumer devices;
  c. appending to each of the consumer input data points one of a number of predictive segmentation attributes thereby creating a plurality of consumer-attribute pair combinations;
  d. counting a total number of consumer-attribute pair combinations;
  e. converting the total number of consumer-attribute pair combinations into a statistical metric, wherein each statistical metric is an index value relaying propensity information;
  f. and constructing an insight graph displaying the propensity information.

13. The method of claim 12, further comprising the step of performing one or more of the following result relaying tasks:
  a. transmitting the insight graph;
  b. appending the propensity information to data housed at a client database; and
  c. matching the propensity information to a matching universe to generate an audience report, wherein the matching universe comprises audience data pertaining to consumers associated with the plurality of devices.

14. The method of claim 13, further wherein the step of performing one or more of the following result relaying tasks comprises outputting results to at least one client machine over the network.

* * * * *